US012703234B2

(12) United States Patent
Yi et al.

(10) Patent No.: US 12,703,234 B2
(45) Date of Patent: Aug. 11, 2026

(54) BATTERY PACK, VEHICLE BODY, AND VEHICLE

(71) Applicant: BYD COMPANY LIMITED, Shenzhen (CN)

(72) Inventors: Bengang Yi, Shenzhen (CN); Junfei Yan, Shenzhen (CN); Yiwei Diao, Shenzhen (CN); Yubo Lian, Shenzhen (CN); Heping Ling, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 311 days.

(21) Appl. No.: 18/535,859

(22) Filed: Dec. 11, 2023

(65) Prior Publication Data

US 2024/0123811 A1 Apr. 18, 2024

Related U.S. Application Data

(63) Continuation of application No. PCT/CN2022/110298, filed on Aug. 4, 2022.

(30) Foreign Application Priority Data

Aug. 6, 2021 (CN) ......................... 202110902937.8

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B62D 25/025* (2013.01);
(Continued)

(58) Field of Classification Search
CPC ............. B60K 1/04; B60K 2001/0438; H01M 50/242; H01M 50/271; H01M 2220/20; H01M 50/204; H01M 50/249
See application file for complete search history.

(56) References Cited

U.S. PATENT DOCUMENTS 11,155,150 B2 * 10/2021 Stephens ................ B60K 11/02
2014/0182958 A1 7/2014 Rawlinson et al.
2020/0365955 A1 11/2020 Kim

FOREIGN PATENT DOCUMENTS

CN 109873095 A 6/2019
CN 110316259 A 10/2019
(Continued)

OTHER PUBLICATIONS

International Search Report and Written Opinion for Application No. PCT/CN2022/110298, mailed on Oct. 25, 2022, 8 pages.

*Primary Examiner* — Marc Q Jimenez
*Assistant Examiner* — James J Triggs
(74) *Attorney, Agent, or Firm* — Sheppard Mullin Richter & Hampton LLP

(57) ABSTRACT

A battery pack includes a battery core; a cover plate, the battery core connected with the cover plate; a side frame, the cover plate connected with the side frame; and a cooling plate connected with the side frame, where the battery core is disposed in an accommodating space formed among the cover plate, the cooling plate, and the side frame. A vehicle body includes a vehicle body frame having a notch, and the battery pack. The side frame of the battery pack is connected with the vehicle body frame, and the cover plate of the battery pack seals the notch as a vehicle body floor.

19 Claims, 9 Drawing Sheets

(51) Int. Cl.

| | |
|---|---|
| ***B62D 25/02*** | (2006.01) |
| ***B62D 25/20*** | (2006.01) |
| ***H01M 10/613*** | (2014.01) |
| ***H01M 10/625*** | (2014.01) |
| ***H01M 10/653*** | (2014.01) |
| ***H01M 10/6554*** | (2014.01) |
| ***H01M 10/6556*** | (2014.01) |
| ***H01M 50/204*** | (2021.01) |
| ***H01M 50/249*** | (2021.01) |
| ***H01M 50/264*** | (2021.01) |
| ***H01M 50/271*** | (2021.01) |

(52) U.S. Cl.

CPC ...... *B62D 25/2036* (2013.01); *H01M 10/613* (2015.04); *H01M 10/625* (2015.04); *H01M 10/653* (2015.04); *H01M 10/6554* (2015.04); *H01M 10/6556* (2015.04); *H01M 50/204* (2021.01); *H01M 50/249* (2021.01); *H01M 50/264* (2021.01); *H01M 50/271* (2021.01); *B60K 2001/0438* (2013.01); *H01M 2220/20* (2013.01)

(56) References Cited

FOREIGN PATENT DOCUMENTS

| | | | |
|---|---|---|---|
| CN | 110994068 | A | 4/2020 |
| CN | 111063959 | A | 4/2020 |
| CN | 213340506 | U | 6/2021 |
| CN | 213366734 | U | 6/2021 |
| CN | 213752908 | U | 7/2021 |
| WO | 2023030245 | A1 | 3/2023 |

* cited by examiner

BATTERY PACK, VEHICLE BODY, AND VEHICLE

CROSS-REFERENCE TO RELATED APPLICATIONS

This application is a Continuation Application of International Patent Application No. PCT/CN2022/110298, filed on Aug. 4, 2022, which is based on and claims priority to and benefits of Chinese Patent Application No. 202110902937.8, filed on Aug. 6, 2021, The entire content of all of the above-referenced applications is incorporated herein by reference.

FIELD

The present disclosure relates to the field of vehicle technologies, and more particularly, to a battery pack, a vehicle body, and a vehicle.

BACKGROUND

In the related art, a vehicle body is generally provided with a floor a battery mounting traverse beam is arranged below the floor, and a battery pack is mounted on the vehicle body through the battery mounting traverse beam, but a gap exists between the floor and the battery pack, resulting in a large size of a vertical direction of a vehicle.

An existing battery pack includes a cover plate, a cooling plate, a battery core, and a tray bottom plate that are sequentially arranged from top to bottom, with multiple components and a large weight.

SUMMARY

The present disclosure resolves at least one of the technical problems existing in the related art and provides a battery pack, a vehicle body, and a vehicle.

A first aspect of the present disclosure provides a battery pack, including:

a battery core;

a cover plate, the battery core connected with the cover plate;

a side frame, the cover plate connected with the side frame; and a cooling plate connected with the side frame, where the battery core is disposed in an accommodating space formed among the cover plate, the cooling plate, and the side frame.

In an embodiment, a structural adhesive is disposed between the cover plate and the battery core, and the battery core is adhered to the cover plate.

In an embodiment, a thermally conductive adhesive is disposed between a first surface of the cooling plate close to the battery core and the battery core, and a cooling channel is formed on a second surface of the cooling plate away from the battery core.

In an embodiment, the battery pack further includes a protection plate disposed on a second surface of the cooling plate away from the battery core and connected with the side frame.

In an embodiment, a height of the side frame is not less than a height of the battery core in an up-down direction.

In an embodiment, the side frame includes a first frame, a second frame, a third frame, and a fourth frame that are connected, the first frame and the third frame are disposed opposite to each other, the second frame and the fourth frame are disposed opposite to each other, and a tab is disposed on a side of the battery core facing the first frame or the third frame.

In an embodiment, the first frame includes a protrusion portion extending away from the third frame, the protrusion portion includes a power distribution cavity, the side frame further includes an assembly plate, and the assembly plate is connected with the protrusion portion to cover the power distribution cavity.

In an embodiment, the assembly plate is detachable from the protrusion portion.

In an embodiment, the side frame further includes a longitudinal beam, the longitudinal beam is disposed in the side frame and extends along a rear-front direction.

In an embodiment, a height of the longitudinal beam is equal to a height of the battery core in an up-down direction.

In an embodiment, the side frame further includes a connection transverse beam, the connection transverse beam are connected between the second frame and the fourth frame, the connection transverse beam is connected with the side frame to form multiple sub-frames.

In an embodiment, the battery pack includes multiple battery core rows, each of the battery core rows includes multiple battery cores, and the battery cores are disposed along a right-left direction.

In an embodiment, the side frame further includes a longitudinal beam, the longitudinal beam is connected with the side frame and extends along a rear-front direction, and the connection transverse beam includes a groove for the longitudinal beam to pass through.

In this embodiment of the present disclosure, the battery pack includes the cover plate, the battery core, and the cooling plate from top to bottom, and the cooling plate is used as a bottom plate of the battery pack, to seal the battery pack, thereby omitting a tray bottom plate in the related art, reducing components, reducing a weight, and also reducing a height of the battery pack. In the present disclosure, the battery core is connected with the cover plate, and a weight of the battery core is carried by the cover plate. Therefore, the cooling plate is not damaged by carrying the battery core, so that the cooling plate can not only implement thermal management of the battery core, but also seal the battery pack, to implement integration.

A second aspect of the present disclosure provides a vehicle body, including a vehicle body frame and the battery pack, the vehicle body frame including a notch; and the side frame connected with the vehicle body frame, and the cover plate sealing the notch as a vehicle body floor.

In an embodiment, the vehicle body frame includes a first sill beam and a second sill beam that are disposed opposite to each other along a width direction of the vehicle body, the notch extends from the first sill beam to the second sill beam in the width direction of the vehicle body, and the side frame is connected with the first sill beam and the second sill beam.

In an embodiment, the vehicle body further includes a seat transverse beam, the seat transverse beam is connected between the first sill beam and the second sill beam in the width direction of the vehicle body, and the seat transverse beam is connected with the battery pack.

In the present disclosure, the cover plate of the battery pack is formed as a vehicle body floor, that is, no additional vehicle body floor needs to be arranged. On one hand, a quantity of parts is reduced, and the production costs and a weight of the whole vehicle are reduced. On the other hand, a height from the ground to the battery pack is larger, an arrangement space of the battery pack is larger, and probability of damaging the battery pack can be reduced. In addition, compared with the related art that the vehicle body is provided with a floor, the vehicle body in this embodiment of the present disclosure does not need to reserve an assembly gap between the floor and the battery pack, thereby effectively improving the whole vehicle space utilization rate.

A third aspect of the present disclosure provides a vehicle, including the vehicle body.

Other aspects and advantages of the present disclosure will be given in the following description, some of which will become apparent from the following description or may be learned from practices of the present disclosure.

BRIEF DESCRIPTION OF THE: DRAWINGS

The foregoing and/or additional aspects and advantages of the present disclosure will become apparent and comprehensible in the description of the embodiments made with reference to the following accompanying drawings.

REFERENCE NUMERALS

Figure 1:
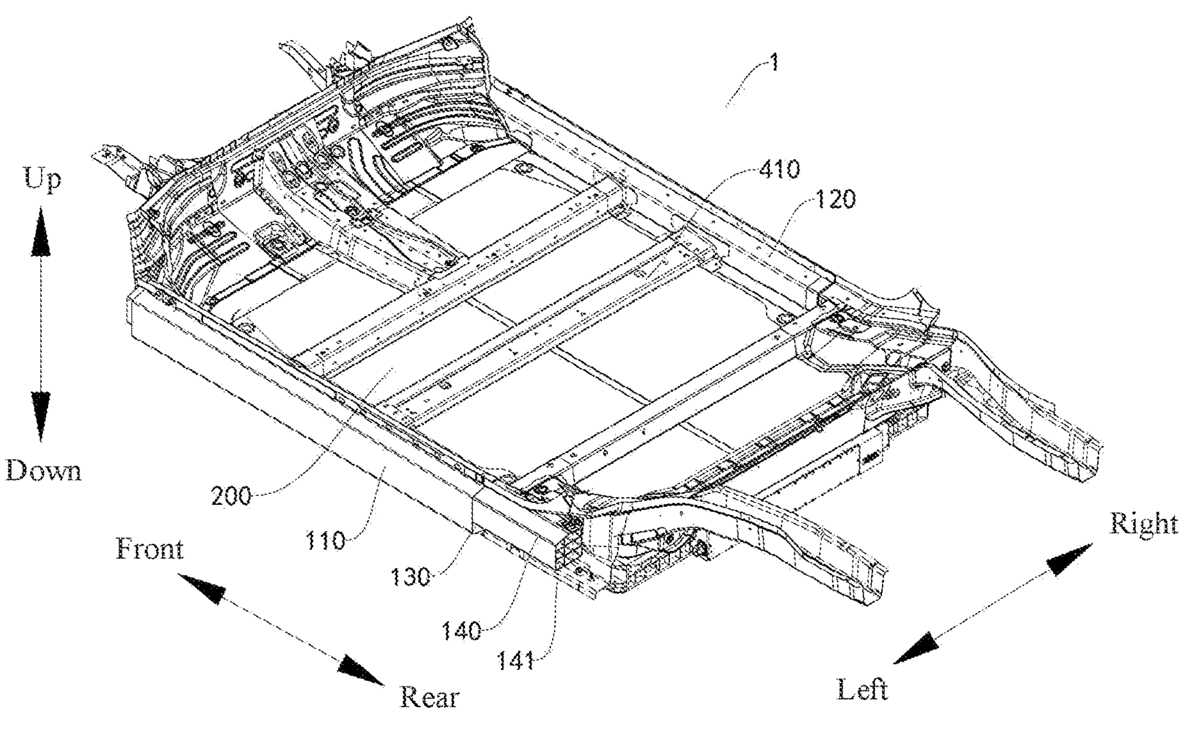
FIG. 1 is a schematic structural diagram of a vehicle body according to an embodiment of the present disclosure.

1: Vehicle body;

100: Vehicle body frame; 101: Notch; 110: First sill beam; 120: Second sill beam; 130: Energy absorption space; 140: Sill reinforcing beam; 141: Energy absorption cavity; 150: Sill inner plate; 160: Sill outer plate;

200: Battery pack; 210: Cover plate; 220: Battery core; 221: Tab; 230: Heat insulation plate; 240: Cooling plate; 241: Cooling channel; 250: Diverging channel; 260: Heat exchange channel; 270: Protection plate; 280: Heat preservation plate;

300: Side frame; 301: Collapse cavity; 310: Second frame; 311: First boss; 312: First upper guiding rib; 313: First lower guiding rib; 320: Fourth frame; 321: Second boss; 322: Second upper guiding rib; 323: Second lower guiding rib; 330: First frame; 332: assembly plate; 333: Protrusion portion; 334: Power distribution cavity; 340: Third frame;

400: Connection transverse beam; 410: Seat transverse beam; and 500: Sealing member.

DETAILED DESCRIPTION

The embodiments of the present disclosure are described in detail below, and the embodiments described with reference to accompanying drawings are exemplary.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In the description of the present disclosure, "multiple" means two or more than two.

As shown in FIG. 1 to FIG. 9, an embodiment of the present disclosure provides a battery pack 200 and a vehicle body 1 having the battery pack 200.

The battery pack 200 includes a battery core 220, a cover plate 210, a side frame 300, and a cooling plate 240. The battery core 220 is connected with the cover plate 210, the cover plate 210 is connected with the side frame 300. The cooling plate 240 and the side frame 300 are connected. An accommodating space of the battery core 220 is formed among the cover plate 210, the cooling plate 240, and the side frame 300 to accommodate the battery core 220.

In this embodiment of the present disclosure, the battery pack 200 includes the cover plate 210, the battery core 220, and the cooling plate 240 from top to bottom, and the cooling plate 240 is used as a bottom plate of the battery pack 200, to seal the battery pack 200, thereby omitting a tray bottom plate in the related art, reducing components, reducing a weight, and also reducing a height of the battery pack 200. In the present disclosure, the battery core 220 is connected with the cover plate 210, and a weight of the battery core 220 is carried by the cover plate 210. Therefore, the cooling plate 240 is not damaged by carrying the battery core 220, so that the cooling plate 240 can not only implement thermal management of the battery core 220, but also seal the battery pack 200, to implement integration.

Figure 3:
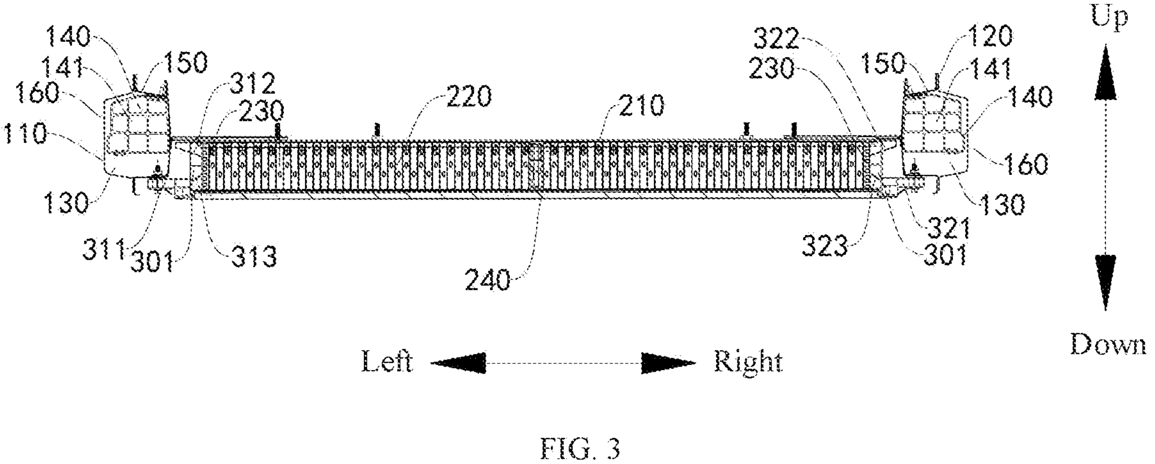
FIG. 3 is a cross-sectional view of a first sill beam and a second sill beam on a vehicle body and a battery pack according to an embodiment of the present disclosure.
Figure 4:
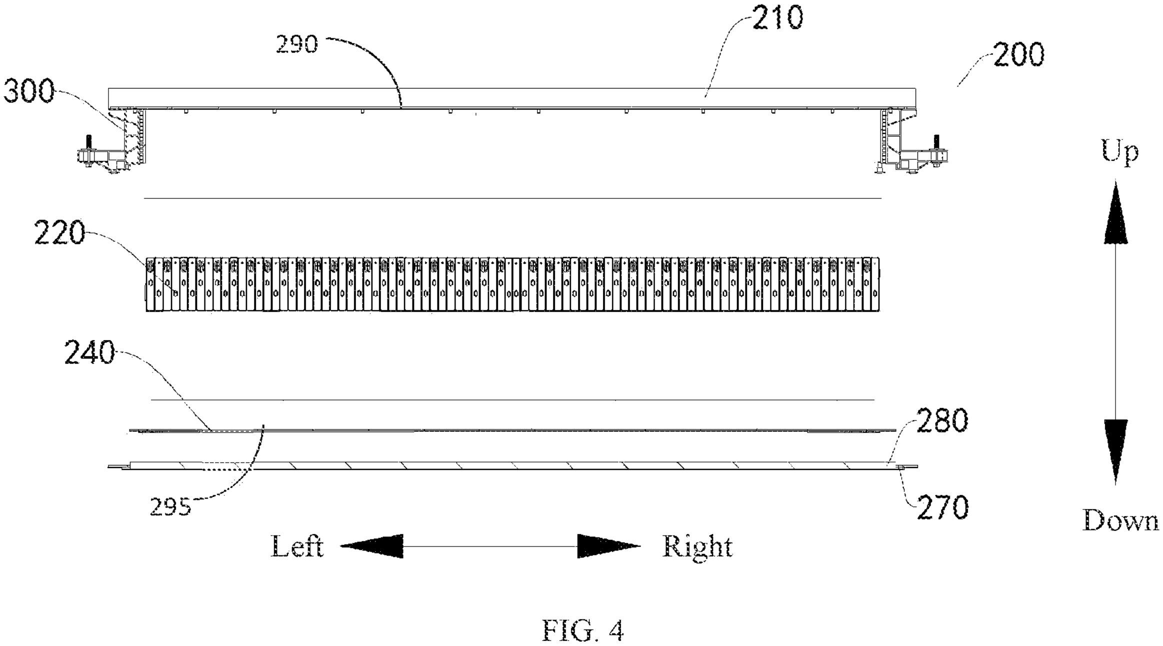
FIG. 4 is an exploded view of a battery pack of a vehicle body according to an embodiment of the present disclosure.

In some embodiments of the present disclosure, as shown in FIG. 3 and FIG. 4, a structural adhesive 290 is arranged/disposed between the cover plate 210 and the battery core 220, so that the battery core 220 is adhered to the cover plate 210. Therefore, the cover plate 210 and the battery core 220 have no gap and are connected more tightly, and the weight of the battery core 220 is carried by the cover plate 210, to increase the space utilization.

In this embodiment of the present disclosure, a side of the cooling plate 240 close to the battery core 220 (e.g., a first surface) is formed as a plane, and a thermally conductive adhesive 295 is arranged between the plane and the battery core 220. The plane is arranged for placement of the battery core 220, and the thermally conductive adhesive fills a gap between the cooling plate 240 and the battery core 220, so that the cooling plate 240 and the battery core 220 are connected more tightly, and thermal conductivity of the thermally conductive adhesive is greater than thermal conductivity of air, which facilitates heat dissipation. A cooling channel 241 is formed on a side of the cooling plate 240 away from the battery core 220 (e.g., a second surface). In an embodiment, the cooling channel 241 is protruded. In this way, the cooling plate 240 can reduce a temperature of the battery core 220, to avoid a reduction in working efficiency due to overheating of the battery core 220, thereby ensuring the working performance of the battery core 220 and prolonging the service life of the battery core 220.

In an embodiment, the cooling channel 241 includes a diverging channel 250 and multiple heat exchange channels 260. The diverging channels 250 are provided on two opposing sides of the cooling plate 240, the multiple heat exchange channels 260 are provided between the two opposing sides of the cooling plate 240 and extend from one side to another side, and at least one end of each heat exchange channel 260 is in communication with the diverging channel 250.

In an embodiment, when the battery pack 200 is mounted on the vehicle body, the diverging channels 250 are provided on the two opposing sides of the cooling plate 240 along a width direction of the vehicle body, and the multiple heat exchange channels 260 extend along the width direction of the vehicle body.

For example, the cooling plate 240 includes a main plate, a harmonica tube, and a diverging plate. The harmonica tube is mounted on a lower surface of the main plate, an upper surface of the main plate is formed as a side surface of the cooling plate 240 close to the battery core 220, and the multiple heat exchange channels 260 are formed in the harmonica tube, or the multiple heat exchange channels 260 are jointly formed by the harmonica tube and the main plate. The diverging plate is formed through stamping and welded (for example, brazed) to the lower surface of the main plate, the diverging plate is buckled on two ends of the harmonica tube, and the diverging channel 250 is jointly formed by the diverging plate and the main plate and is in communication with the multiple heat exchange channels 260.

A cooling medium in the cooling channel 241 serpentinely flows in the multiple heat exchange channels 260. In this way, the diverging channel 250 is formed by using the stamped diverging plate, which can save the space. The heat exchange channel 260 is formed by using the harmonica tube, which can reduce the weight and the costs. In some specific embodiments of the present disclosure, as shown in FIG. 4, the battery pack 200 further includes a protection plate 270. The protection plate 270 is arranged on the side of the cooling plate 240 away from the battery core 220 and is connected with the side frame 300. In the related art, the protection plate 270 is arranged below a tray bottom plate.

In this embodiment of the present disclosure, a heat preservation plate 280 is further arranged between the protection plate 270 and the cooling plate 240, thereby improving the heat exchange efficiency.

The protection plate 270 may be made of high-strength steel. Because strength of the protection plate 270 is higher than strength of the heat preservation plate 280 and strength of the cooling plate 240, the protection plate 270 can protect the heat preservation plate 280 and the cooling plate 240 from damage. The heat preservation plate 280 may be made of a foamed plate, and the heat preservation plate 280 can reduce heat exchange between the cooling plate 240 and an external environment, and improve the cooling efficiency of the cooling plate 240 on the battery core 220.

Figure 5:
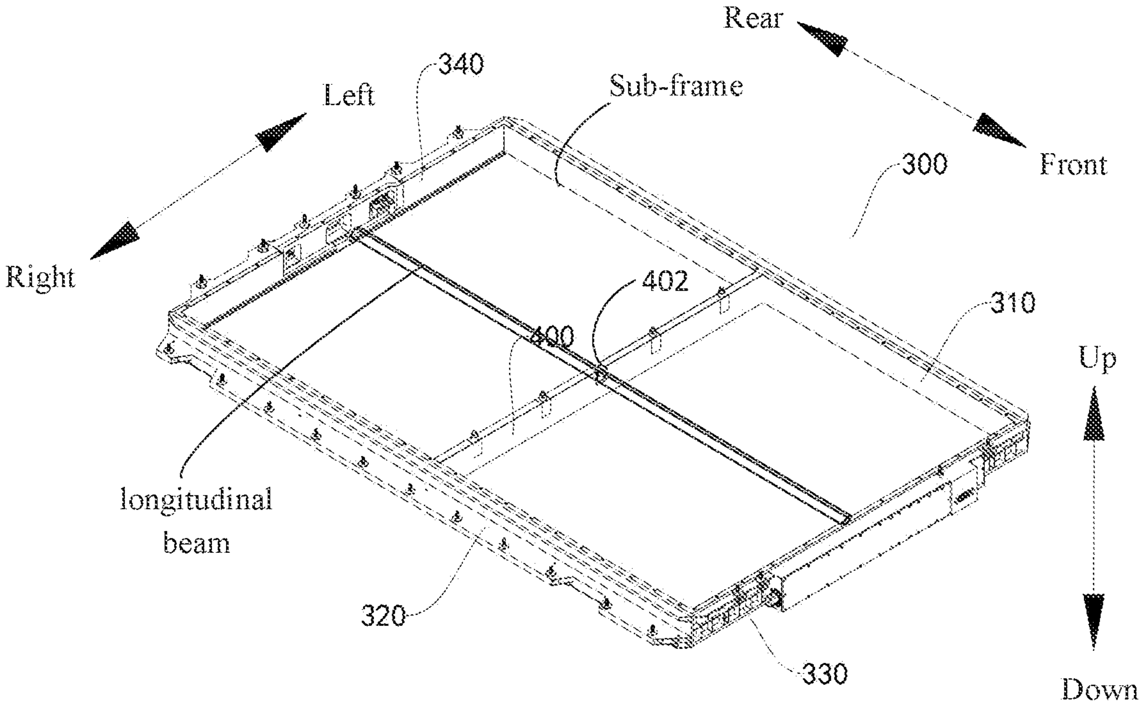
FIG. 5 is a schematic structural diagram of a side frame of a battery pack according to an embodiment of the present disclosure.
Figure 6:
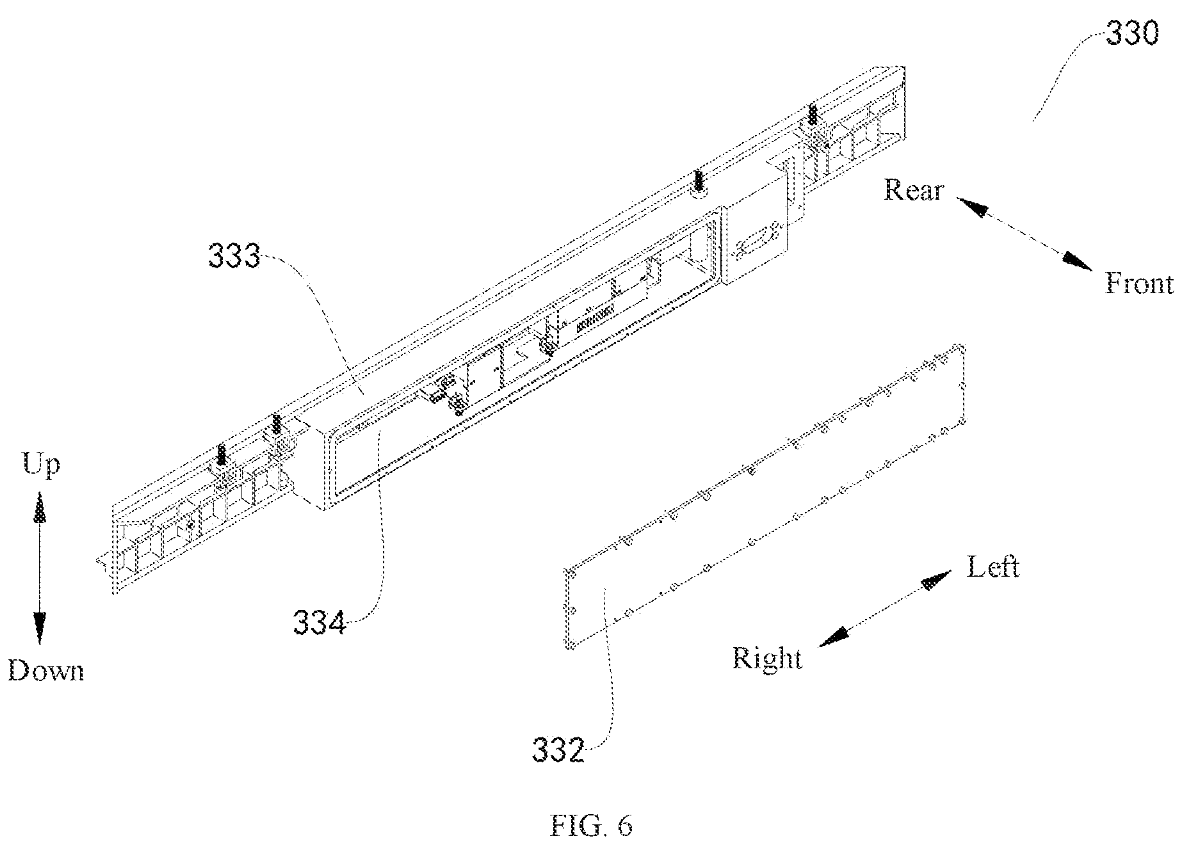
FIG. 6 is a schematic structural diagram of a first frame according to an embodiment of the present disclosure.
Figure 7:
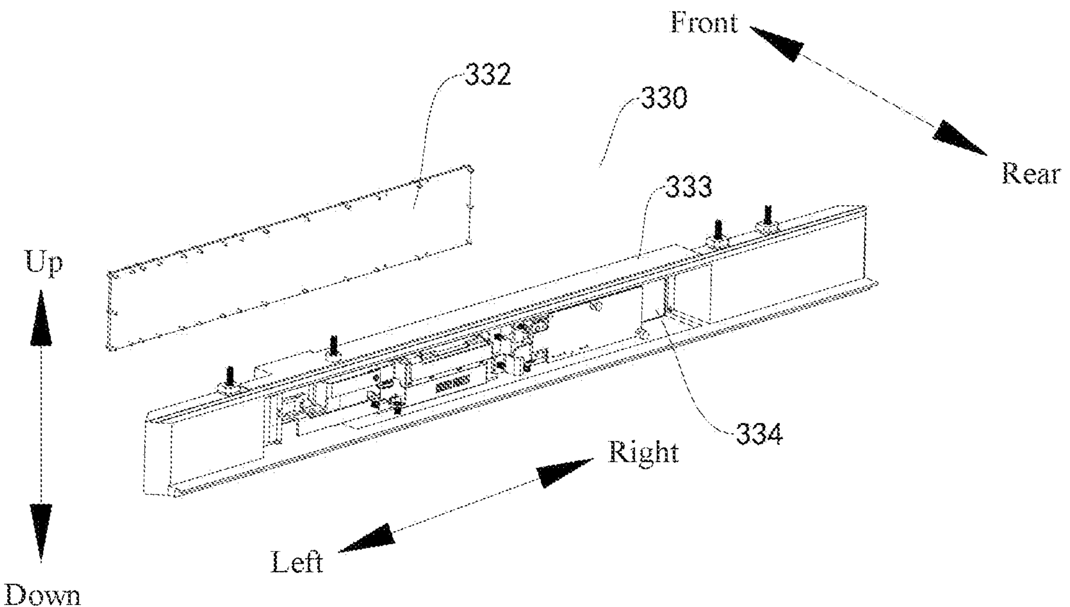
FIG. 7 is a schematic structural diagram of a first frame from another perspective according to an embodiment of the present disclosure.
Figure 8:
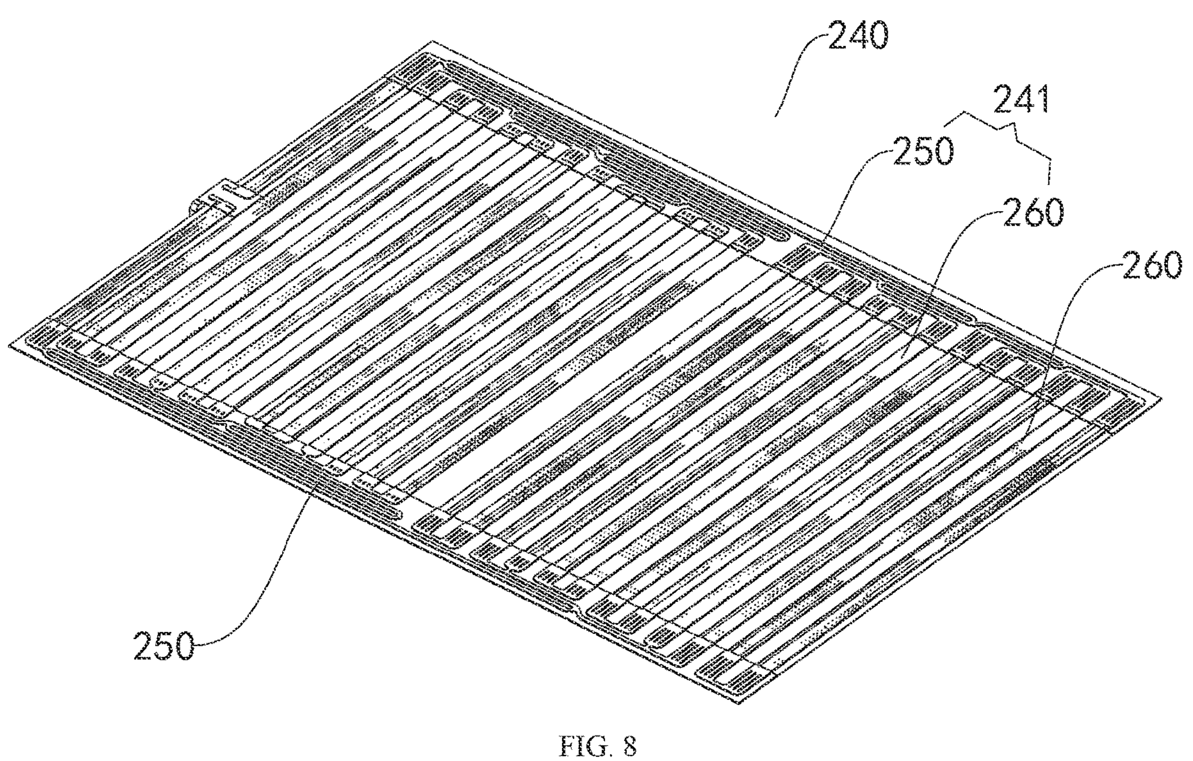
FIG. 8 is a schematic structural diagram of a cooling plate according to an embodiment of the present disclosure.
Figure 9:
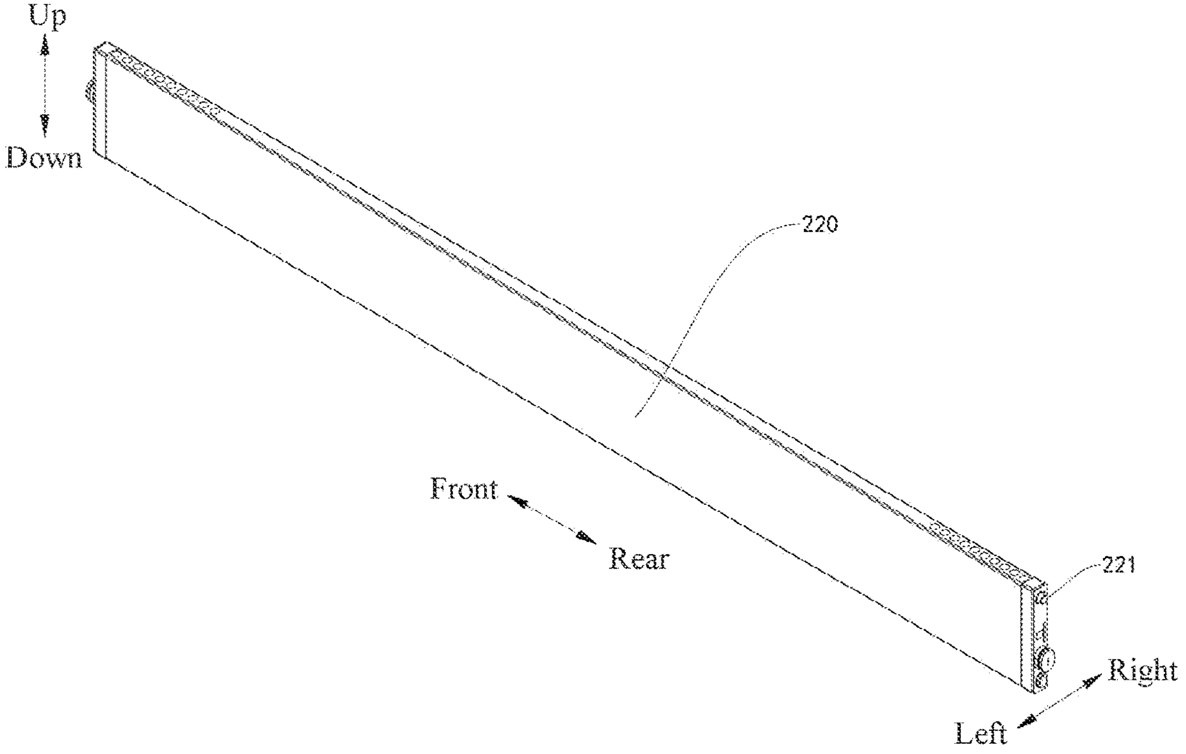
FIG. 9 is a schematic structural diagram of a battery core according to an embodiment of the present disclosure.

In some specific embodiments of the present disclosure, as shown in FIG. 5 to FIG. 7, an extension length (e.g., a height) of the side frame 300 is not less than an extension length (e.g., a height) of the battery core 220 in a direction from the cover plate 210 to the cooling plate 240 (e.g., an up-down direction).

In an embodiment, a distance from a side surface (e.g., an upper surface) of the side frame 300 close to the cover plate 210 to the cooling plate 240 is not less than a distance from a side surface (e.g., an upper surface) of the battery core 220 close to the cover plate 210 to the cooling plate 240, and a distance from a side surface (e.g., a bottom surface) of the side frame 300 close to the cooling plate 240 to the cover plate 210 is not less than a distance from a side surface (e.g., a bottom surface) of the battery core close to the cooling plate 240 to the cover plate 210. That is, the upper surface of the side frame 300 is not lower than an upper surface of the battery core 220, and a lower surface of the side frame 300 is not higher than a lower surface of the battery core 220.

Therefore, viewed from a horizontal direction, the entire battery core 220 is blocked by the side frame 300 and is protected by the side frame 300. The side frame 300 protects an outer peripheral surface of the battery core 220 more comprehensively, to avoid interference between the outer peripheral surface of the battery core 220 and an external object. In addition, when an outer peripheral surface of the battery pack 200 has a collision, a force on the side frame 300 can be more uniformly transmitted to the battery core 220, so that the force on the entire battery core 220 is uniform, thereby reducing a breakage probability of the battery core 220.

In this embodiment of the present disclosure, the side frame 300 includes a first frame 330, a second frame 310, a third frame 340, and a fourth frame 320, the first frame 330 and the third frame 340 are oppositely arranged (e.g., disposed opposite to each other), the second frame 310 and the fourth frame 320 are oppositely arranged (e.g., disposed opposite to each other), and a tab is arranged on a side of the battery core 220 facing the first frame 330 or the third frame 340, that is, the battery core extends along a direction from the first frame 330 to the third frame 340.

In this embodiment of the present disclosure, a side of the first frame 330 away from the third frame 340 extends outward to form a protrusion portion 333. The side frame 300 further includes an assembly plate 332, and the assembly plate 332 is connected with the protrusion portion 333, to cover a power distribution cavity 334 surrounded by the protrusion portion 333 and the assembly plate 332. A power distribution apparatus is arranged in the power distribution cavity 334.

In other words, the first frame 330 integrates two functions of protecting the battery core 220 and accommodating the power distribution apparatus. The power distribution apparatus is accommodated through extension of the side frame 300 along a height of the battery core 220, and no additional accommodating structure of the power distribution apparatus is arranged in the direction from the first frame 330 to the third frame 340, thereby improving the space utilization. In addition, the assembly plate 332 and the protrusion portion 333 are detachably connected by a threaded fastener (a bolt or a screw) or a rivet, and a maintenance sealing ring may be arranged between the assembly plate 332 and the protrusion portion 333, to seal a gap between the assembly plate 332 and the protrusion portion 333, thereby facilitating maintenance and replacement of the power distribution apparatus. In addition, a reinforcing rib is configured on the protrusion portion 333 to improve structural strength of the protrusion portion 333.

In an embodiment, the battery pack 200 further includes a longitudinal beam and a conductive member. The longitudinal beam is connected with the side frame 300 and extends along the direction from the first frame 330 to the third frame 340 (e.g., a rear-front direction), and a threading space is formed in the longitudinal beam to accommodate an electrical wire, so that the conductive member is connected to the power distribution apparatus in the power distribution cavity 334 conveniently.

In this embodiment of the present disclosure, an extension length (e.g., a height) of the longitudinal beam is the same as the extension length (e.g., a height) of the battery core 220 in the direction from the cover plate 210 to the cooling plate 240 (e.g., the up-down direction). The longitudinal beam extends in a height direction of the battery core to form the threading space, thereby improving the space utilization. To electrically conduct the power distribution apparatus and a rear-wheel drive motor of a vehicle, the battery pack 200 may be used in a four-wheel drive vehicle without damaging the structural integrity of the battery pack 200 in an up-down direction and a left-right direction, so that the battery pack 200 takes into account both reliability of an electrical connection and structural strength of the battery pack. In the present disclosure, the height direction or the up-down direction of the battery core 220 is consistent with the direction from the cover plate 210 to the cooling plate 240.

In some embodiments of the present disclosure, as shown in FIG. 3, there are multiple battery cores 220, and the multiple battery cores form multiple battery core rows. The side frame 300 further includes a connection transverse beam 400, and the connection transverse beam 400 is connected between the second frame 310 and the fourth frame 320, to form multiple sub-frames within the side frame 300. As such, the first frame 330, the front halves of the second frame 310 and the fourth frame 320, and the transverse beam 400 form a first sub-frame, and the third frame 340, the rear halves of the second frame 310 and the fourth frame 320, and the transverse beam 400 form a second sub-frame. The multiple battery core rows are arranged in the multiple sub-frames.

It may be understood that the battery core row includes multiple battery cores 220, and the multiple battery cores 220 are arranged along a direction from the second frame 310 to the fourth frame 320 (e.g., a right-left direction). A groove 402 allowing the longitudinal beam to pass through is provided on the connection transverse beam 400.

In some embodiments, multiple connection transverse beams 400 may be arranged, and the multiple connection transverse beams 400 are arranged along the direction from the first frame 330 to the third frame 340. Because an end portion of the battery core 220 is provided with a tab 221 connected with another electrical member, a gap exists between two adjacent battery core rows, and the connection transverse beam 400 is supported between the second frame 310 and the fourth frame 320 and placed between the two adjacent battery core rows.

In this embodiment of the present disclosure, the vehicle body includes a vehicle body frame 100 and the battery pack 200. A notch 101 is formed on the vehicle body frame 100, the side frame 300 of the battery pack 200 is connected with the vehicle body frame 100, and the cover plate 210 seals the notch 101 to form a vehicle body floor.

In the present disclosure, the cover plate 210 of the battery pack 200 is formed as the vehicle body floor, that is, no additional vehicle body floor needs to be arranged. On one hand, a quantity of parts is reduced, and the production costs and a weight of the whole vehicle are reduced. On the other hand, a height from the ground of the battery pack 200 is larger, an arrangement space of the battery pack 200 is larger, and a damage probability of the battery pack 200 can be reduced. In addition, compared with the related art that the vehicle body is provided with a floor, the vehicle body 1 in this embodiment of the present disclosure does not need to reserve an assembly gap between the floor and the battery pack 200, thereby effectively improving the whole vehicle space utilization rate.

In some specific embodiments of the present disclosure, as shown in FIG. 4, the vehicle body further includes a sealing member 500. The sealing member 500 is connected between the battery pack 200 and the vehicle body frame 100, to seal the cover plate 210 of the battery pack 200 and the vehicle body frame 100. It should be noted that, in the present disclosure, when the battery pack 200 is mounted on the vehicle body, the direction from the first frame 330 to the third frame 340 is consistent with a length direction of the vehicle body, the direction from the second frame 310 to the fourth frame 320 is consistent with a width direction of the vehicle body, and the direction from the cover plate 210 to the cooling plate 240 is consistent with a height direction of the vehicle body.

As shown in FIG. 3, the vehicle body frame 100 includes a first sill beam 110 and a second sill beam 120 that are oppositely arranged along the width direction of the vehicle body, the notch 101 extends from the first sill beam 110 to the second sill beam 120 in the width direction of the vehicle body, and two sides of the side frame 300 of the battery pack 200 are respectively connected with the first sill beam 110 and the second sill beam 120.

In this way, the connection transverse beam 400 arranged between the second frame 310 and the fourth frame 320 can bear part of a collision force when the first sill beam 110 and the second sill beam 120 of the vehicle have a collision, thereby increasing the structural strength of the battery pack 200. In addition, after the connection transverse beam 400 is connected to a seat transverse beam 410, modal rigidity and torsional rigidity of the battery pack 200 can be improved, and the structural strength of the battery pack 200 can be increased.

In addition, in the embodiment shown in FIG. 3, the vehicle body 1 further includes a seat transverse beam 410. The seat transverse beam 410 is connected between the first sill beam 110 and the second sill beam 120 in the width direction of the vehicle body, and the seat transverse beam 410 passes through the cover plate 210 of the battery pack 200 and is connected to the connection transverse beam 400 of the battery pack 200.

Because the battery core 220 extends along the length direction of the vehicle body, the multiple battery cores 220 are arranged along the width direction of the vehicle body. In this way, when the first sill beam 110 and the second sill beam 120 have a collision, the battery core 220 can play a role of force transmission and support, and the force on the battery core 220 is more uniform, thereby improving strength of the battery core 220 against a side collision of the vehicle, and effectively avoiding a short circuit due to bending of the battery core 220.

When the battery pack 200 is used in a vehicle, multiple battery cores 220 may be arranged in a length direction of the vehicle body frame 100 according to a length of the vehicle body frame 100 to adapt to different vehicle models. In a width direction of the vehicle body frame 100, total power of the battery pack 200 can be changed by increasing or reducing a quantity of battery cores 220. To arrange the battery cores 220 as much as possible in the width direction of the vehicle body frame 100, the multiple battery cores 220 may be closely arranged, so that when the battery pack 200 is stressed in the width direction of the vehicle body frame 100, it is ensured that each battery core 220 participates in force transmission, the structural strength is increased, and the space utilization in the battery pack 200 can be improved. By arranging the multiple battery cores 220 in the width direction of the vehicle body frame 100, when a road obstacle collides with the bottom of the vehicle in a traveling process of the vehicle, a quantity of damaged battery cores 220 can be greatly reduced, the space utilization in the battery pack 200 can be improved, and a volume of the whole battery core 220 is increase, thereby increasing a proportion of the volume of the entire battery core 220 to the volume of the battery pack 200, that is, improving energy density of the battery pack 200.

In an embodiment, a heat insulation plate 230 is arranged between the battery core 220 and the side frame 300, In this way, direct contact between the side frame 300 and the battery core 220 can be prevented, so as to avoid heat exchange between the battery core 220 closest to the side frame 300 and the outside through the side frame 300, ensure that temperatures of the multiple battery cores 220 are substantially similar, and optimize the overall working performance of the multiple battery cores 220. In addition, the heat insulation plate 230 can not only perform heat insulation, but also has an insulating effect, and the heat insulation plate 230 can also absorb an assembly gap between the battery core 220 and the side frame 300.

In an embodiment, the first sill beam 110 and the second sill beam 120 each are configured with an energy absorption space 130, and the energy absorption space 130 of the first sill beam 110 and the energy absorption space 130 of the second sill beam 120 each are provided with a sill reinforcing beam 140 to protect the battery pack 200 in the width direction of the vehicle body.

When the vehicle has a side collision, the energy absorption space 130 can absorb energy to cushion a collision force transmitted from the first sill beam 110 and second sill beam 120 to the battery pack 200. In addition, through the arrangement of the sill reinforcing beam 140, structural strength of the first sill beam 110 and the second sill beam 120 can be enhanced, so that the first sill beam 110 and the second sill beam 120 can bear a larger collision force, and the sill reinforcing beam 140 also plays a role of energy absorption and force transmission. Therefore, a force transmitted to the battery pack 200 can be reduced, and transmission of the collision force can also be guided, thereby effectively protecting the battery pack 200 and enhancing safety when a side collision accident occurs.

For example, the sill reinforcing beam 140 may be made of metal aluminum or aluminum alloy, so that the sill reinforcing beam 140 is not only lighter in quality, but also easier to manufacture a more complex structure, and the planarity of the sill reinforcing beam 140 is higher. Therefore, the vehicle body 1 in this embodiment of the present disclosure has the advantages of high space utilization, high structural strength, high safety, and the like.

Figure 2:
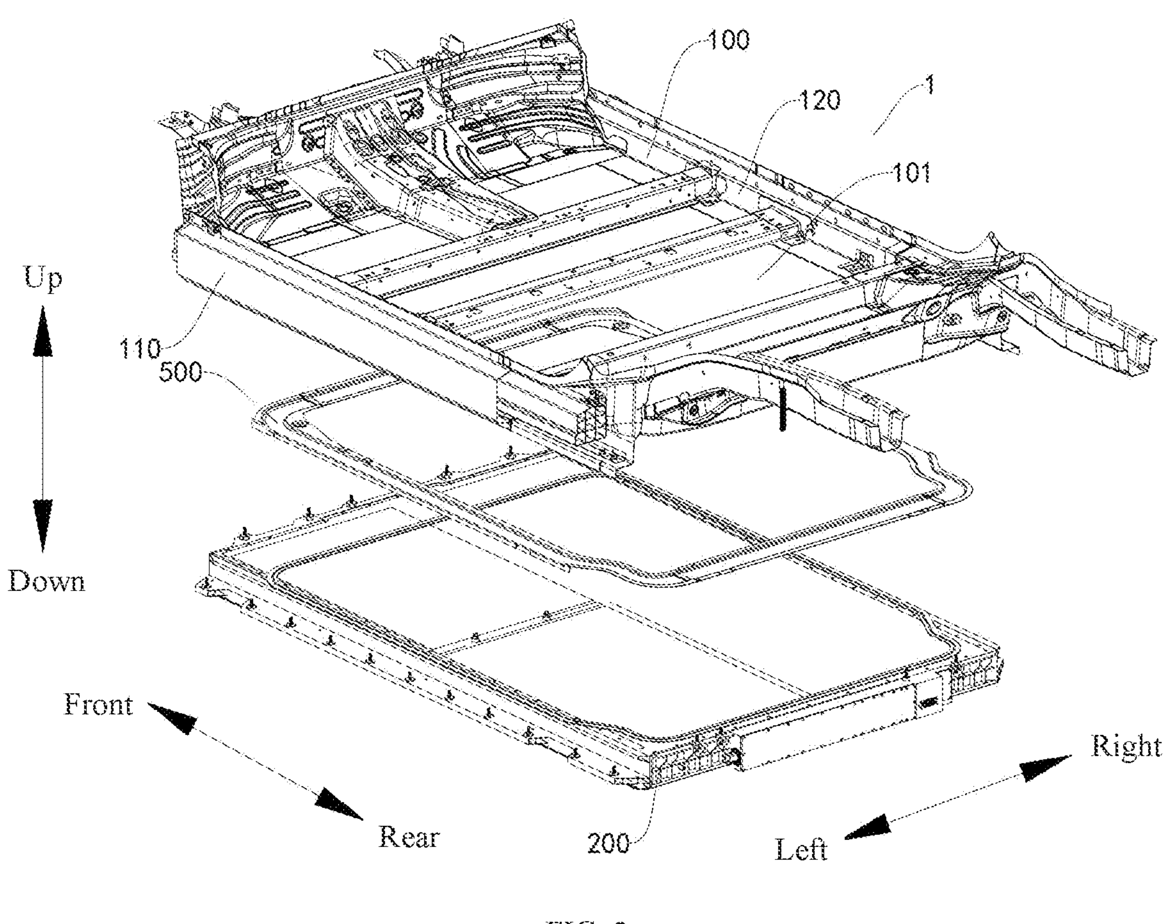
FIG. 2 is an exploded view of a vehicle body according to an embodiment of the present disclosure.

In some specific embodiments of the present disclosure, as shown in FIG. 1 to FIG. 3, at least one energy absorption cavity 141 is configured in each sill reinforcing beam 140, and the energy absorption cavity 141 extends along a length direction of the sill reinforcing beam 140.

In this way, the sill reinforcing beam 140 can absorb collision energy through the energy absorption cavity 141, to improve bearing capacities of the first sill beam 110 and the second sill beam 120 to the collision force, thereby effectively avoiding transmission of the collision force to the battery pack 200. Multiple energy absorption cavities 141 are provided in a cross section of each sill reinforcing beam 140 in an up-down direction and in a left-right direction. In this way, the sill reinforcing beam 140 has a stronger ability to absorb the collision energy, and the bearing capacities of the first sill beam 110 and the second sill beam 120 to the collision force are improved. In addition, the sill reinforcing beam 140 can absorb the collision force for multiple times in both the up-down direction and the left-right direction, and the energy absorption cavity 141 occupies a larger proportion in the cross section of the sill reinforcing beam 140, to avoid a case that the collision force does not pass through the energy absorption cavity 141 when the sill reinforcing beam 140 is partially collided, thereby more effectively preventing the collision force from being transmitted to the battery pack 200.

In an embodiment, the sill reinforcing beam 140 is connected with at least an inner side wall and a top wall of the energy absorption space 130 in which the sill reinforcing beam is located, that is, at least one of a left side surface and a right side surface of the sill reinforcing beam 140 and an upper surface are in contact with an inner wall of the energy absorption space 130. In this way, the sill reinforcing beam 140 is fixed in both the left-right direction and the up-down direction, and the position stability of the sill reinforcing beam 140 is higher.

In some embodiments of the present disclosure, as shown in FIG. 3, the upper surface of the sill reinforcing beam 140 is higher than an upper surface of the battery pack 200, and a lower surface of the sill reinforcing beam 140 is lower than the upper surface of the battery pack 200. That is, viewed from the horizontal direction, the sill reinforcing beam 140 and the battery pack 200 partially overlap.

In this way, when a left, side or a right side of the vehicle has a collision, a force can be necessarily transmitted between the sill reinforcing beam 140 and the battery pack 200, it can be ensured that the battery pack 200 is protected by the sill reinforcing beam 140, and the battery pack 200 can transmit the force between the sill reinforcing beam 140 of the first sill beam 110 and the sill reinforcing beam 140 of the second sill beam 120.

In some embodiments of the present disclosure, as shown in FIG. 3, the first sill beam 110 and the second sill beam 120 each include a sill inner plate 150 and a sill outer plate 160. The sill outer plate 160 is connected with a side of the sill inner plate 150 facing away from the battery pack 200 and defines the energy absorption space 130 together with the sill inner plate 150, for example, the sill inner plate 150 and the sill outer plate 160 may be welded. The sill reinforcing beam 140 is mounted on at least one of the sill inner plate 150 and the sill outer plate 160. In this way, noise and vibration caused by shaking of the sill reinforcing beam 140 in the energy absorption space 130 can be avoided when the vehicle is traveling, and the position reliability of the sill reinforcing beam 140 is higher, thereby improving noise, vibration, and harshness (NVH) performance of the where vehicle.

The side frame 300 is mounted to the first sill beam 110 and the second sill beam 120, and at least one collapse cavity 301 is configured in the side frame 300. Because the collapse cavity 301 is located between the battery core 220 and the first sill beam 110 and the collapse cavity 301 is located between the battery core 220 and the second sill beam 120, the force transmitted from the first sill beam 110 and the second sill beam 120 toward the battery core 220 can be effectively absorbed, and the force transmitted from the first sill beam 110 and the second sill beam 120 is effectively attenuated, so that the force on the battery core 220 is smaller, the battery core 220 is less likely to be damaged, and the safety is higher.

In some embodiments of the present disclosure, as shown in FIG. 3 and FIG. 5, the second frame 310 is located between the first sill beam 110 and the battery core 220, and the second frame 310 is provided with a first boss 311, a first upper guiding rib 312, and a first lower guiding rib 313. The first boss 311 is mounted on a lower surface of the first sill beam 110, the first upper guiding rib 312 is inclined downward and extends into the collapse cavity 301 of the second frame 310 in the direction from the second frame 310 to the fourth frame 320, the first lower guiding rib 313 is arranged in the collapse cavity 301 of the second frame 310 and corresponds to a position of the first boss 311 in a height direction, and the first lower guiding rib 313 is inclined upward from left to right in the direction from the second frame 310 to the fourth frame 320. For example, the first boss 311 is threadedly connected with the first sill beam 110.

The fourth frame 320 is located between the second sill beam 120 and the battery core 220, and the fourth frame 320 is provided with a second boss 321, a second upper guiding rib 322, and a second lower guiding rib 323. The second boss 321 is mounted on a lower surface of the second sill beam 120, the second upper guiding rib 322 is inclined downward from right to left and extends into the collapse cavity 301 of the fourth frame 320 in a direction from the fourth frame 320 to the second frame 310, the second lower guiding rib 323 is arranged in the collapse cavity 301 of the fourth frame 320 and corresponds to a position of the second boss 321 in a height direction, and the second lower guiding rib 323 is inclined upward in the direction from the fourth frame 320 to the second frame 310.

When the first sill beam 110 transmits a force to the battery pack 200, there are the following force transmission paths.

First, the first sill beam 110 transmits the force through the first upper guiding rib 312 of the side frame 300, and the first upper guiding rib 312 transmits the force to the collapse cavity 301, and then the force attenuated by the collapse cavity 301 is transmitted to the battery core 220.

Second, the first sill beam 110 transmits the force to the first boss 311 at a lower side, the first boss 311 transmits the force to the first lower guiding rib 313, and the first lower guiding rib 313 transmits the force to the collapse cavity 301, and then the force attenuated by the collapse cavity 301 is transmitted to the battery core 220.

A force transmission path transmitted from the second sill beam 120 to the battery pack 200 is similar to the force transmission path transmitted from the first sill beam 110 to the battery pack 200. Details are not described in the present disclosure again.

In this way, the first sill beam 110 transmits the force to an upper portion and a lower portion of the side frame 300 through the first upper guiding rib 312 and the first lower guiding rib 313, and the second sill beam 120 also transmits the force to the upper portion and the lower portion of the side frame 300 through the second upper guiding rib 322 and the second lower guiding rib 323, so that the force transmitted to the battery core 220 is more dispersed, which avoids the damage to the battery pack 200 caused by an excessively large local force, and improves the whole vehicle safety performance. In the present disclosure, the battery core 220 is located on a side collision path, and all the battery cores extending along the length direction of the vehicle body participate in force transmission with a large force transmission area, which reduces the pressure on the battery core 220 in a force transmission direction, and reduces a damage probability of the battery core 220 while the battery core can participate in force transmission. In addition, when the first sill beam 110 has a collision, the battery pack 200 can perform partial force transmission and energy absorption, and no gap needs to be reserved between the battery pack 200 and the first sill beam 110, so that the volume of the battery pack 200 can be larger and the power of the battery pack 200 can be effectively improved.

A vehicle according to an embodiment of the present disclosure is described below with reference to the accompanying drawings. The vehicle includes the vehicle body 1 according to the foregoing embodiments of the present disclosure.

According to the vehicle in this embodiment of the present disclosure, the vehicle has the advantages of high space utilization, high structural strength, high safety, and the like through the vehicle body 1 in the foregoing embodiments of the present disclosure.

Other compositions and operations of the vehicle body 1 and the vehicle including the vehicle body according to the embodiments of the present disclosure are known to those of ordinary skill in the art, and are not described herein again in detail.

In the descriptions of this specification, descriptions using reference terms "an embodiment", "some embodiments", "an exemplary embodiment", "an example", "a specific example", or "some examples" mean that characteristics, structures, materials, or features described with reference to the embodiment or example are included in at least one embodiment or example of the present disclosure. In this specification, exemplary descriptions of the foregoing terms do not necessarily refer to the same embodiment or example.

Although the embodiments of the present disclosure have been shown and described, a person of ordinary skill in the art should be understand that various changes, modifications, replacements, and variations may be made to the embodiments without departing from the principles and spirit of the present disclosure, and the scope of the present disclosure is as defined by the appended claims and their equivalents.

What is claimed is:

1. A battery pack, comprising:

a battery core;

a cover plate, the battery core connected with the cover plate;

a side frame, the cover plate connected with the side frame; and a cooling plate connected with the side frame, wherein the battery core is disposed in an accommodating space formed among the cover plate, the cooling plate, and the side frame, wherein the side frame comprises a first frame, a second frame, a third frame, and a fourth frame that are connected and an assembly plate, the first frame and the third frame are disposed opposite to each other, the first frame comprises a protrusion portion extending away from the third frame, the protrusion portion comprises a power distribution cavity, and the assembly plate is connected with the protrusion portion to cover the power distribution cavity.

2. The battery pack according to claim 1, wherein a structural adhesive is disposed between the cover plate and the battery core, and the battery core is adhered to the cover plate.

3. The battery pack according to claim 1, further comprising a thermally conductive adhesive disposed between a first surface of the cooling plate close to the battery core and the battery core, and a cooling channel formed on a second surface of the cooling plate away from the battery core.

4. The battery pack according to claim 1, further comprising a protection plate disposed on a second surface of the cooling plate away from the battery core and connected with the side frame.

5. The battery pack according to claim 1, wherein a height of the side frame is not less than a height of the battery core in an up-down direction.

6. The battery pack according to claim 1, wherein the second frame and the fourth frame are disposed opposite to each other, and a tab is disposed on a side of the battery core facing the first frame or the third frame.

7. The battery pack according to claim 1, wherein the assembly plate is detachable from the protrusion portion.

8. The battery pack according to claim 6, wherein the side frame further comprises a longitudinal beam, the longitudinal beam is disposed in the side frame and extends along a rear-front direction.

9. The battery pack according to claim 8, wherein a height of the longitudinal beam is equal to a height of the battery core in an up-down direction.

10. The battery pack according to claim 6, wherein the side frame further comprises a connection transverse beam, the connection transverse beam are connected between the second frame and the fourth frame, the connection transverse beam is connected with the side frame to form a plurality of sub-frames.

11. The battery pack according to claim 1, further comprising a plurality of battery core rows, wherein each of the battery core rows comprises a plurality of battery cores, and the battery cores are disposed along a right-left direction.

12. The battery pack according to claim 10, wherein the side frame further comprises a longitudinal beam, the longitudinal beam is connected with the side frame and extends along a rear-front direction, and the connection transverse beam comprises a groove for the longitudinal beam to pass through.

13. A vehicle body, comprising a vehicle body frame and a battery pack, the vehicle body frame comprising a notch;

the battery pack comprising:

a battery core;

a cover plate, the battery core connected with the cover plate;

a side frame, the cover plate connected with the side frame; and a cooling plate connected with the side frame, wherein the battery core is disposed in an accommodating space formed among the cover plate, the cooling plate, and the side frame; and the side frame connected with the vehicle body frame, and the cover plate sealing the notch as a vehicle body floor, wherein the side frame comprises a first frame, a second frame, a third frame, and a fourth frame that are connected and an assembly plate, the first frame and the third frame are disposed opposite to each other, the first frame comprises a protrusion portion extending away from the third frame, the protrusion portion comprises a power distribution cavity, and the assembly plate is connected with the protrusion portion to cover the power distribution cavity.

14. The vehicle body according to claim 13, wherein the vehicle body frame comprises a first sill beam and a second sill beam that are disposed opposite to each other along a width direction of the vehicle body, the notch extends from the first sill beam to the second sill beam in the width direction of the vehicle body, and the side frame is connected with the first sill beam and the second sill beam.

15. The vehicle body according to claim 14, further comprising a seat transverse beam, the seat transverse beam being connected between the first sill beam and the second sill beam in the width direction of the vehicle body, and the seat transverse beam being connected with the battery pack.

16. The vehicle body according to claim 13, wherein a structural adhesive is disposed between the cover plate and the battery core, and the battery core is adhered to the cover plate.

17. The vehicle body according to claim 13, wherein the battery pack comprises a thermally conductive adhesive disposed between a first surface of the cooling plate close to the battery core and the battery core, and a cooling channel formed on a second surface of the cooling plate away from the battery core.

18. The vehicle body according to claim 13, wherein the battery pack comprises a protection plate disposed on a second surface of the cooling plate away from the battery core and connected with the side frame.

19. A vehicle, comprising a vehicle body, the vehicle body comprising a vehicle body frame and a battery pack;

the vehicle body frame comprising a notch;

the battery pack comprising:

a battery core;

a cover plate, the battery core being connected with the cover plate;

a side frame, the cover plate being connected with the side frame; and a cooling plate connected with the side frame, wherein the battery core is disposed in an accommodating space formed among the cover plate, the cooling plate, and the side frame; and the side frame being connected with the vehicle body frame, and the cover plate sealing the notch as a vehicle body floor, wherein the side frame comprises a first frame, a second frame, a third frame, and a fourth frame that are connected and an assembly plate, the first frame and the third frame are disposed opposite to each other, the first frame comprises a protrusion portion extending away from the third frame, the protrusion portion comprises a power distribution cavity, and the assembly plate is connected with the protrusion portion to cover the power distribution cavity.

* * * * *